United States Patent
Henry et al.

(12) 
(10) Patent No.: US 6,581,151 B2
(45) Date of Patent: Jun. 17, 2003

(54) APPARATUS AND METHOD FOR SPECULATIVELY FORWARDING STOREHIT DATA BASED ON PHYSICAL PAGE INDEX COMPARE

(75) Inventors: G. Glenn Henry, Austin, TX (US); Rodney E. Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 0 days.

(21) Appl. No.: 09/908,349

(22) Filed: Jul. 18, 2001

(65) Prior Publication Data

US 2003/0018875 A1 Jan. 23, 2003

(51) Int. Cl.[7] .............................................. G06F 12/00
(52) U.S. Cl. ........................ 711/203; 711/204; 711/213
(58) Field of Search ................................ 711/203, 204, 711/213

(56) References Cited

U.S. PATENT DOCUMENTS 5,471,593 A * 11/1995 Branigin ..................... 712/235
5,694,577 A * 12/1997 Kiyohara et al. ............ 711/167
5,895,501 A * 4/1999 Smith .......................... 711/207
6,216,200 B1 * 4/2001 Yeager ........................ 711/100

* cited by examiner

Primary Examiner—Reba I. Elmore
(74) Attorney, Agent, or Firm—E. Alan Davis; James W. Hoffman

(57) ABSTRACT

A speculative store forwarding apparatus in a pipelined microprocessor that supports paged virtual memory is disclosed. The apparatus includes comparators that compare only the physical page index of load data with the physical page indexes of store data pending in store buffers to detect a potential storehit. If the indexes match, forwarding logic speculatively forwards the newest storehit data based on the index compare. The index compare is performed in parallel with a TLB lookup of the virtual page number of the load data, which produces a load physical page address. The load physical page address is compared with the store data physical page addresses to verify that the speculatively forwarded storehit data is in the same page as the load data. If the physical page addresses mismatch, the apparatus stalls the pipeline in order to correct the erroneous speculative forward. The microprocessor stalls until the correct data is fetched.

34 Claims, 4 Drawing Sheets

Store Forwarding Apparatus

Store Forwarding Apparatus

*Virtual Address Translation*

Serialized Store Forwarding

APPARATUS AND METHOD FOR SPECULATIVELY FORWARDING STOREHIT DATA BASED ON PHYSICAL PAGE INDEX COMPARE

FIELD OF THE INVENTION

This invention relates in general to the field of store forwarding, and more particularly to store forwarding in microprocessors supporting paged memory.

BACKGROUND OF THE INVENTION

It is common for modern microprocessors to operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach*, $2^{nd}$ edition, by John L. Hennessy and David A. Patterson, Morgan Kaufmann Publishers, San Francisco, Calif., 1996. The authors go on to provide the following excellent illustration of pipelining:

"A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line."

Thus, as instructions are fetched, they are introduced into one end of the pipeline. They proceed through pipeline stages within a microprocessor until they complete execution. However, as instructions proceed through the pipeline stages, an instruction executing in an early, or upper, pipeline stage may require a result of another instruction executing ahead of it in a later, or lower, pipeline stage.

One situation in which one instruction executing in a higher pipeline stage requires a result generated by a preceding instruction executing in a lower pipeline stage is referred to as a storehit condition. A storehit condition exists when a load instruction requests store data specified by a store instruction executing ahead of the load instruction in the pipeline. That is, the load instruction specifies a load address for load data, wherein the load address matches a store address for the store data specified by the store instruction issued previous to the load instruction, and the store data is still in the microprocessor pipeline, i.e., has not yet been updated in the microprocessor data cache or written to system memory.

It has been observed that storehit conditions occur relatively frequently in modern microprocessors, particularly in x86 microprocessors. This phenomenon is largely attributed to the fact that modern compilers recognize the relatively small number of registers available in the x86 register file and the fact that virtually every contemporary x86 processor has a large built-in data cache that is essentially accessible at the same speed as the register file. Therefore, when the compilers run out of registers in the register file, they use the data cache as a huge register file. In particular, compilers have been observed to generate code that causes storehit conditions in the following situations.

First, a loop counter variable is stored in a memory location. Second, a memory location is used as a temporary location for a sequence of arithmetic operations. Third, a stack location is accessed within a very short instruction sequence due to the calling of a very short subroutine. That is, a return address is pushed, followed by a jump to the subroutine, followed by a very small number of instructions of the subroutine, followed by a pop of the return address generating a storehit on the location of the return address.

In a storehit condition, the load instruction must be provided with coherent data, i.e., the newest data associated with the load address. Thus, the microprocessor cannot supply the data from its data cache or go to system memory to get the data since the newest data is within the pipeline and not in the data cache or system memory. One solution is for the microprocessor to stall and wait for the storehit data to be updated in the data cache or system memory, and then provide the data to the load instruction from the data cache or system memory. However, this solution has obvious performance disadvantages. A higher performance solution is to determine the newest data matching the load address, and to forward the newest data from the stage in which the store is pending to the load instruction stage.

Forwarding storehit data is complicated by the fact that many microprocessors use a paged memory scheme. In a paged memory scheme, virtual addresses of load and store instructions must be translated into physical addresses in order to access memory properly. In order to detect a storehit and to forward the proper data, the physical address of the load must be compared with the physical addresses of the stores pending in the processor. Comparing virtual addresses will not suffice since the load and stores could have different virtual addresses and yet still be referring to the same physical address in a paged memory system.

Paging microprocessors typically employ a translation-lookaside buffer (TLB) to cache physical addresses previously translated from virtual addresses. The virtual address is provided to the TLB, which looks up the virtual address and provides the translated physical address of the virtual address if the physical address is cached in the TLB. The TLB improves data access time by avoiding having to repeat the lengthy task of translating a virtual address to its physical address for recently accessed data.

In order to detect a storehit condition, the physical address of the load instruction is compared with the physical address of the pending stores in the pipeline. If a storehit occurs, the newest storehit data is forwarded to the load instruction. Presently, the TLB lookup, the physical address comparison and the data forwarding are serialized. The serialized time of these operations may be the critical path for processor cycle timing purposes. Therefore, what is needed is a method for reducing the serialized time in order to reduce processor cycle time and thereby improve processor performance.

SUMMARY

The present invention provides a method and apparatus in a paging microprocessor for reducing store forwarding time by speculatively forwarding based on a physical page index comparison of a load and pending stores rather than waiting to compare the full physical addresses. Accordingly, in attainment of the aforementioned object, it is a feature of the present invention to provide a speculative store forwarding apparatus in a microprocessor pipeline. The pipeline includes first and second stages. The first stage receives load data specified by a load virtual address. The second stage stores store data pending in the pipeline for writing to a store physical address. The load virtual address includes a load virtual page number and a load physical page index. The store physical address includes a store physical page address and a store physical page index. The apparatus includes an index comparator that compares the load physical page index with the store physical page index. The apparatus also includes forwarding logic, coupled to the index comparator, which forwards the store data from the second stage to the first stage if the index comparator indicates the load physical page index matches the store physical page index.

In another aspect, it is a feature of the present invention to provide a microprocessor supporting paged virtual memory. The microprocessor includes an index match indicator that indicates whether a physical page index of load data specified by a load instruction matches a physical page index of store data pending in the microprocessor. The microprocessor also includes forwarding logic, coupled to the index match indicator, which forwards the store data to the load instruction if the index match indicator indicates that the load and store data physical page indexes match. The forwarding logic forwards the store data to the load instruction based on the index match indicator prior to determining whether the load and store data reside in a same physical memory page.

In another aspect, it is a feature of the present invention to provide a method for speculatively forwarding storehit data in a microprocessor pipeline. The method includes comparing a physical page index of data specified by a load instruction with a physical page index of store data pending in the pipeline. The method also includes forwarding the store data from a first stage of the pipeline in which the store data is pending to a second stage of the pipeline for receiving the data specified by the load instruction, if the physical page index of data specified by a load instruction matches the physical page index of said store data.

In another aspect, it is a feature of the present invention to provide a pipelined microprocessor. The microprocessor includes a plurality of store buffers that store a plurality of store datum waiting to be written to memory. The microprocessor also includes a plurality of address registers, coupled to the plurality of store buffers, which store a corresponding plurality of physical page indexes of the plurality of store datum. The microprocessor also includes a plurality of index comparators, coupled to the plurality of address registers, which compare the plurality of physical page indexes with a physical page index of data requested by a load instruction. The microprocessor also includes control logic, coupled to the plurality of index comparators, which causes one of the plurality of store datum to be forwarded from the plurality of store buffers to the load instruction, if the plurality of index comparators indicates a corresponding one of the physical page indexes matches the physical page index of the data requested by the load instruction.

An advantage of the present invention is that it reduces the amount of time required to perform a store forward in most cases over the prior method. In particular, the present invention alleviates the need to forego store forwarding if the microprocessor clock cycle timing did not allow sufficient time to forward based on a full physical address compare of the prior method. Additionally, the present invention alleviates the need to add another pipeline stage to accommodate store forwarding based on the full physical compare. This is beneficial because addition of another pipeline stage is detrimental to processor performance in the event of a mispredicted branch, since another stage of branch penalty would be introduced. Finally, the present invention alleviates the need to increase the clock cycle time of the processor to accommodate forwarding based on the full physical compare of the prior method.

Other features and advantages of the present invention will become apparent upon study of the remaining portions of the specification and drawings.

DETAILED DESCRIPTION

Figure 1:
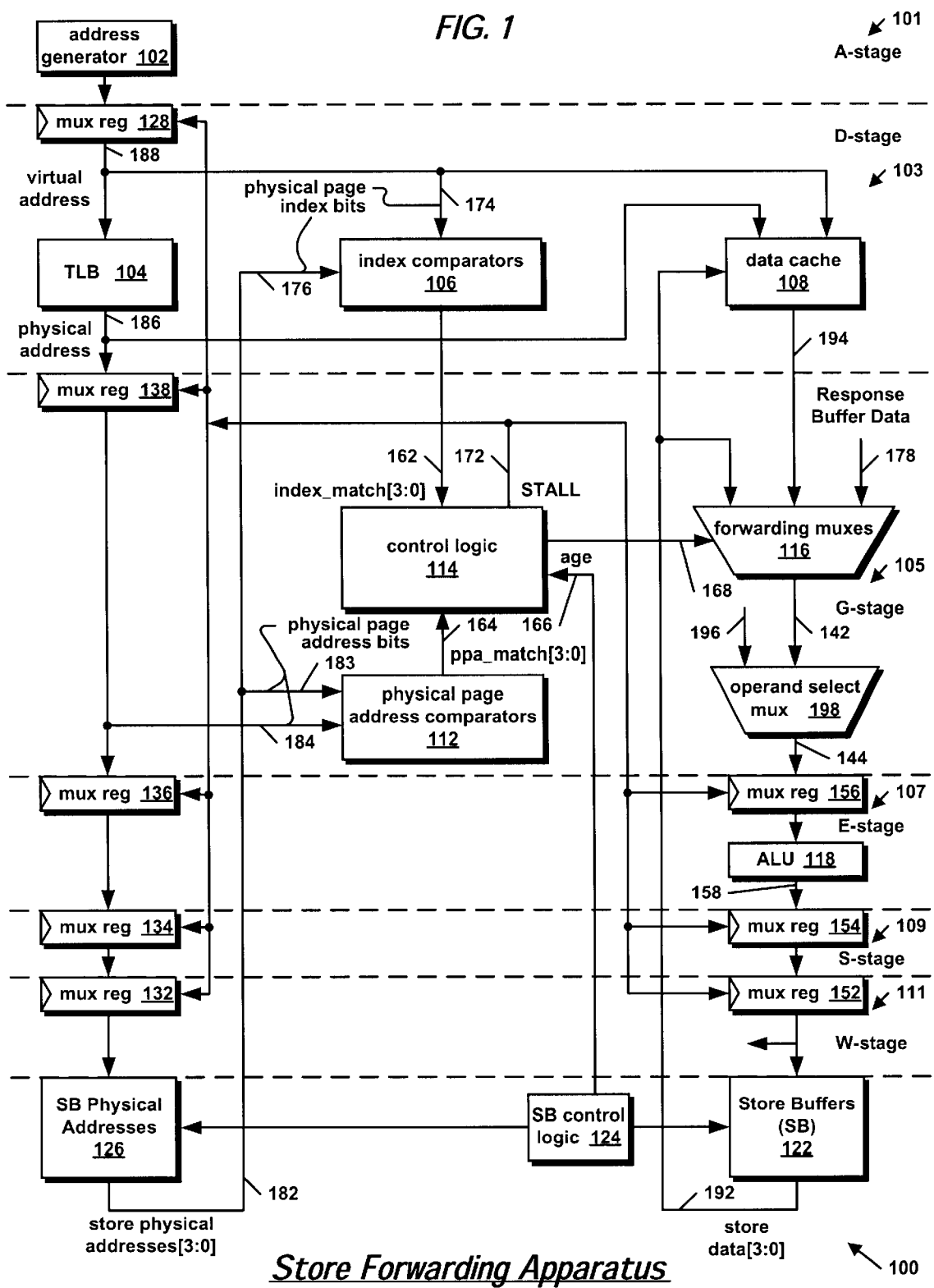
FIG. 1 is a block diagram of a store forwarding apparatus in a pipelined microprocessor according to the present invention.

Referring now to FIG. 1, a block diagram of a store forwarding apparatus in a pipelined microprocessor 100 according to the present invention is shown. In one embodiment, the microprocessor 100 comprises an x86 architecture processor. In one embodiment, the microprocessor 100 comprises a thirteen-stage pipeline. FIG. 1 illustrates the bottom six stages of the pipeline. In particular, FIG. 1 shows an A-stage (Address stage) 101, followed by a D-stage (Data stage) 103, followed by a G-stage (second Data stage) 105, followed by an E-stage (Execution stage) 107, followed by an S-stage (Store stage) 109, followed by a W-stage (Write-Back stage) 111. The upper stages not shown comprise a fetch address generation stage, an instruction fetch stage, two instruction cache access stages, an instruction format stage, an instruction decode or translation stage, and a register file access stage.

In one embodiment, the upper stages of the microprocessor 100 fetch x86 macroinstructions and translate the macroinstructions into microinstructions, or micro-operations, such as load or store instructions. Load instructions specify a memory address from which to load data from memory into the microprocessor 100. Store instructions specify a memory address at which to store data from the microprocessor 100 into memory. In the embodiment of FIG. 1, load data is provided to load instructions in the G-stage 105.

The microprocessor 100 comprises an address generator 102 in the A-stage 101. The address generator 102 generates a virtual address that is provided to a muxed address register 128 in the D-stage 103. In particular, the address generator 102 generates a virtual address that specifies load data or store data for a load or store instruction, respectively. The address generator 102 generates the virtual address of the load or store data based on operands of the load or store instruction. In addition, the address generator 102 generates the virtual address of the load or store instruction based on segment register and descriptor values of the microprocessor 100.

The microprocessor 100 also comprises a translation lookaside buffer (TLB) 104 in the D-stage 103. The TLB 104 receives the virtual address 188 from the D-stage 103 address register 128 and outputs a physical address 186 translated from the virtual address 188. The TLB 104 caches physical addresses that have been previously translated from virtual addresses according to page tables maintained by the operating system executing on the microprocessor 100. If the virtual address 188 hits in the TLB 104, then the TLB 104 provides the corresponding cached physical address 186. The operation is commonly referred to as a "TLB lookup", or "looking up the physical address" in the TLB.

Figure 2:
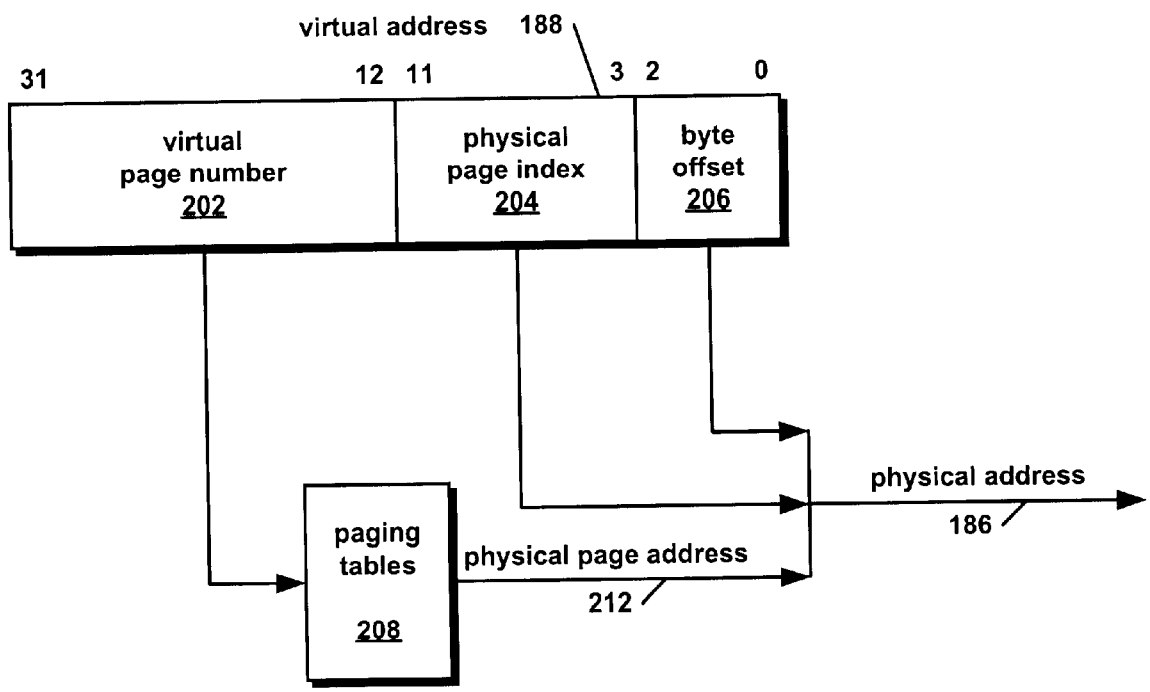
FIG. 2 is a related art block diagram illustrating the virtual address of FIG. 1 and its translation to the physical address of FIG. 1.

Referring now to FIG. 2, a related art block diagram illustrating the virtual address 188 of FIG. 1 and its translation to the physical address 186 of FIG. 1 is shown. The embodiment of FIG. 2 illustrates a virtual address 188 used in a typical paging system with 4 KB pages. However, the present invention is not limited to any particular page size, virtual address size, physical address size, or page translation system. Paging virtual memory systems are well known in the art of processor, computer, and operating system design.

The virtual address 188 comprises a virtual page number field 202. The virtual page number 202 occupies bits 31 through 12 of the virtual address 188. The virtual page number 202 acts as an index into paging tables 208 maintained by the operating system. The page table entry selected by the virtual page number 202 from the paging tables 208 specifies the physical page address 212 of the page containing the data to be accessed. That is, the physical page address 212 specifies the physical address of the page corresponding to the virtual page number 202 in which the specified data resides. In some paging systems, multiple levels of tables in the paging tables 208 must be "walked" in order to obtain the physical page address 212. After the page table walk is performed, the translated physical page address is cached in the TLB 104 of FIG. 1 for fast provision of the physical page address 212 upon subsequent accesses to the same virtual page number 202.

The virtual address 188 also comprises a physical page index field 204. The physical page index 204 occupies bits 11 through 3 of the virtual address 188. The physical page index 204 specifies the offset of a word within the selected page. In the embodiment of FIG. 2, a word comprises 8 bytes. In particular, the physical page index 204 does not require translation by the paging system.

The virtual address 188 also comprises a byte offset field 206. The byte offset 206 occupies bits 2 through 0 of the virtual address 188. The byte offset 206 specifies a byte within the 8-byte word specified by the physical page address 212 and physical page index 204. The byte offset 206 is also not translated by the paging system. The byte offset 206, the physical page index 204, and the physical page address 212 are concatenated to generate the full physical address 186 of the data specified by the virtual address 188.

The present inventors have observed from code traces taken of typical program executions that the condition in which a load instruction and a pending store instruction have the same physical page index but reside in different physical pages is very infrequent. Additionally, the present inventors have observed from code traces that the condition in which two or more store instructions pending in the pipeline have the same physical page index but reside in different physical pages is also very infrequent.

The present invention takes advantage of these observations by speculatively determining a storehit condition by comparing only the physical page index of a load with the physical page index of pending store data. The physical page index comparison is performed substantially in parallel with the TLB lookup. If the physical page indexes match, the storehit data is speculatively forwarded based on the index compare. This is in contrast to the prior method of waiting for the TLB lookup to generate the full physical address of the load instruction and then comparing the full physical address with the full physical addresses of pending stores to detect a storehit condition and forwarding the storehit data, as described with respect to FIG. 4 below.

Referring again to FIG. 1, the microprocessor 100 also comprises a series of muxed address registers 138, 136, 134, and 132 in the G-stage 105, E-stage 107, S-stage 109, and W-stage 111, respectively. The address registers 138, 136, 134, and 132 store the physical address for the corresponding load or store instruction as the instruction proceeds down the microprocessor 100 pipeline. The G-stage 105 address register 138 provides a physical address associated with a load instruction to the G-stage 105 for comparison with pending store data addresses to verify speculatively detected storehits, as will be described below.

The microprocessor 100 also comprises store buffers 122 for storing data associated with store instructions pending in the microprocessor 100 pipeline waiting to be written to memory and/or the data cache 108. In one embodiment, the store buffers 122 comprise four registers for storing four pieces of store data associated with four store instructions pending in the microprocessor 100 pipeline.

The microprocessor 100 also comprises store buffer (SB) physical address registers 126. The SB physical address registers 126 receive the physical address from the W-stage 111 address register 132. If the physical address is for a store instruction, the physical address is stored in one of the SB physical address registers 126. In one embodiment, the SB physical address registers 126 comprise four registers for storing four store instruction physical addresses 182. The four SB physical address registers 126 store the physical addresses 182 corresponding to the four pieces of store data stored in the four store buffers 122.

The microprocessor 100 also comprises store buffer control logic 124. The store buffer control logic 124 controls storage of physical addresses and store data into the SB physical address registers 126 and store buffers 122, respectively. The store buffer control logic 124 maintains information about the relative age of the data stored in each of the store buffers 122 for determining which of the store data is newest. The age information 166 is provided by the store buffer control logic 124 to control logic 114 to enable the control logic 114 to determine which is the newest data in the case of multiple storehits with a load instruction.

The microprocessor 100 also comprises a set of index comparators 106 in the D-stage 103. In one embodiment, the set of index comparators 106 comprises four index comparators. Each of the index comparators 106 receives physical page index bits 174 of the virtual address 188. Each of the index comparators 106 also receives the physical page index bits 176 of one of the pending store data physical addresses 182. In the case of a load instruction proceeding to the D-stage 103, each of the index comparators 106 compares the load physical page index 174 with one of the store data physical page indexes 176. Each of the index comparators 106 generates an index_match signal 162. An index_match signal 162 is true if the load physical page index 174 matches the associated store physical page index 176. The index_match signals 162 are provided to control logic 114. In the embodiment of FIG. 1, the index comparators 106 compare only 9 bits because they are comparing only the physical page indexes, rather than the full 32 bit physical address as is required in the prior art. Advantageously, the index comparators 106 of the present invention are smaller and faster because they compare substantially fewer bits than comparators required to compare a full physical address.

The microprocessor 100 also comprises physical page address comparators 112 in the G-stage 105. In one embodiment, the physical page address comparators 112 comprise four comparators. Each of the physical page address comparators 112 receives a physical page address 184 of a load instruction in the G-stage 105 from the G-stage 105 address register 138. Additionally, each of the physical page address comparators 112 receives a physical page address 183 of one of the store physical addresses 182 from the SB physical address registers 126. Each of the physical page address comparators 112 generates a ppa_match signal 164. A ppa_match signal 164 is true if the load physical page address 184 matches the associated store physical page address 183. That is, the ppa_match signal 164 is true if the load data and associated store data reside in the same physical memory page. The ppa_match signals 164 are provided to control logic 114. In the embodiment of FIG. 1, the physical page address comparators 112 compare only 20 bits because they are comparing only the physical page address, rather than the full 32 bit physical address as is required in the prior art. Advantageously, the physical page address comparators 112 of the present invention are smaller and faster because they compare substantially fewer bits than comparators required to compare a full physical address.

The microprocessor 100 also comprises a data cache 108 in the D-stage 103. The data cache 108 receives the virtual address 188 from address register 128. The data cache 108 provides a cache line 194 in response to the virtual address 188 if the virtual address 188 hits in the data cache 108. The data cache 108 also receives the physical address 186 from the TLB 104. In one embodiment, the data cache 108 is a two-cycle cache.

The microprocessor 100 also comprises forwarding muxes 116 in the G-stage 105. The forwarding muxes 116 receive the cache line 194 from the data cache 108. In addition, the forwarding muxes 116 receive response buffer data 178. If a load instruction requests data that is not in the data cache 108 and is not pending in the microprocessor 100 pipeline, then the data is fetched from memory into a response buffer and provided to the forwarding muxes 116. In addition, the forwarding muxes 116 receive the store data 192 from the store buffers 122.

The forwarding muxes 116 select the response buffer data 178, data from the data cache 108 line 194, or the store data 192 from one of the store buffers 122 and output the selected data 142, based on a control signal 168 provided by control logic 114. In the case of a storehit based on a physical page index comparison performed by the index comparators 106, the control logic 114 controls the forwarding muxes 116 to speculatively forward one of the store data 192 to a load instruction in the G-stage 105. In the case where storehit data was speculatively forwarded incorrectly, the forwarding muxes 116 select either the response buffer data 178 or data from the data cache 108 line 194 as the correct data in order to correct for the incorrect speculative forward. The speculative forwarding operation will be described in more detail below.

The microprocessor 100 also comprises an operand select mux 198. The operand select mux 198 receives the data 142 selected by the forwarding muxes 116. The operand select mux 198 also receives operand data 196 from other sources within the microprocessor 100, such as from the microprocessor 100 register file. The operand select mux 198 outputs the selected operands 144.

The microprocessor 100 also comprises a muxed data register 156 in the E-stage 107 that receives the operands 144 selected by the operand select mux 198. The data register 156 provides the selected operands to one or more arithmetic logic units (ALU) 118 in the E-stage 107. The ALU 118 performs arithmetic or logical operations on the operands provided by the operand select mux 198 and generates a result 158. If the instruction associated with the result data 158 is a store instruction, then the result data is store data.

The microprocessor 100 also comprises a muxed data register 154 in the S-stage 109 that receives the result data 158 from the ALU 118. The microprocessor 100 also comprises a muxed data register 152 in the W-stage 111 that receives the data from the S-stage 109 data register 154. The W-stage 111 selectively writes back the data to the microprocessor 100 register file.

The control logic 114 uses the index_match signals 162, the ppa_match signals 164, and the age signals 166 to control the forwarding muxes 116 via control signal 168. In addition, the control logic 114 generates a STALL signal 172. Each of the address registers 128, 132, 134, 136, and 138, as well as each of the data registers 152, 154, 156 receives the STALL signal 172. If the control logic 114 determines that the forwarding muxes 116 were controlled to speculatively forward storehit data based on the index_match signals 162, and subsequently determines that the speculative forward was incorrect based on the ppa_match signals 164, then the control logic 114 asserts the STALL signal 172 to stall the microprocessor 100 pipeline. That is, the registers 128, 132, 134, 136, 138, 152, 154, and 156 retain their state when the STALL signal 172 is true.

Figure 3:
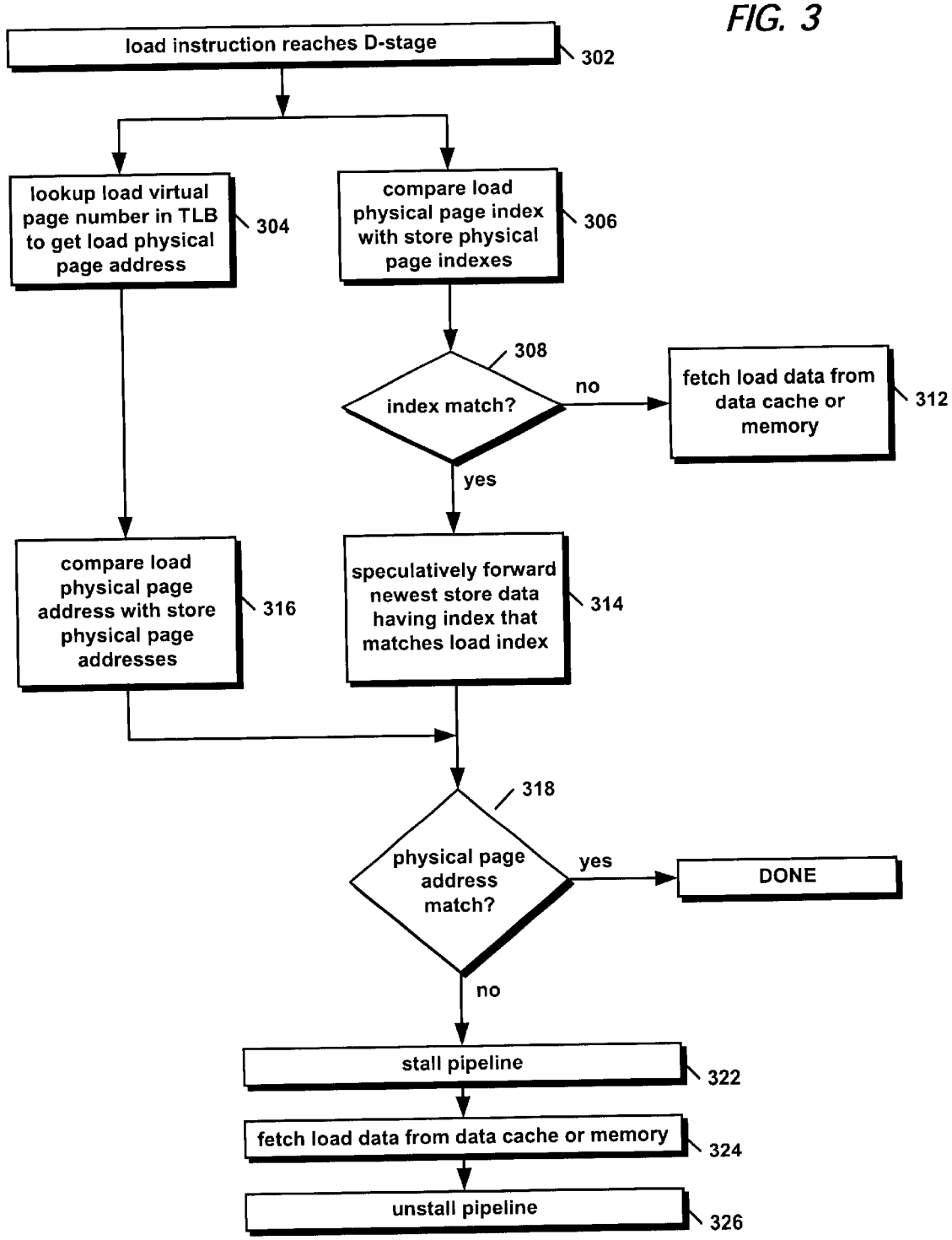
FIG. 3 is a flowchart illustrating operation of the store forwarding apparatus of FIG. 1 to speculatively forward storehit data based on physical page index comparison according to the present invention.

Referring now to FIG. 3, a flowchart illustrating operation of the store forwarding apparatus of FIG. 1 to speculatively forward storehit data based on physical page index comparison according to the present invention is shown. Flow begins at block 302.

At block 302, a load instruction issued by the microprocessor 100 reaches the D-stage 103 of FIG. 1. The load instruction has a corresponding virtual address 188 of FIG. 1 stored in the D-stage address register 128 of FIG. 1. The load instruction was issued by the microprocessor 100 subsequent to store instructions which have associated store data stored in the store buffers 122 of FIG. 1 waiting to be written to memory and/or the data cache 108 of FIG. 1. Flow proceeds from block 302 to blocks 304 and 306. That is, steps 304 and 306 occur substantially in parallel.

At block 304, the load virtual address 188 is provided to the TLB 104 of FIG. 1. The TLB 104 looks up the virtual page number 202 of FIG. 2 of the virtual address 188 and provides the translated physical page address 212 of FIG. 2 of the physical address 186 of FIG. 1 to the address register 138 of FIG. 1. Flow proceeds from block 304 to block 316.

At block 306, the index comparators 106 of FIG. 1 compare the physical page index 174 of FIG. 1 of the virtual address 188 of the load instruction with the physical page indexes 176 of FIG. 1 of the store physical addresses 182 of FIG. 1 and generate the index_match[3:0] signals 162 of FIG. 1. Flow proceeds from block 306 to decision block 308.

At decision block 308, the control logic 114 of FIG. 1 examines the index_match[3:0] signals 162 to determine whether a match occurred between the load physical page index 174 and any of the store physical page indexes 176. If not, flow proceeds to block 312. Otherwise, flow proceeds to block 314.

At block 312, the load data specified by the load instruction is loaded from the data cache 108 or from memory through a response buffer via data path 178 of FIG. 1. This is because a storehit did not occur, as determined during step 308. Flow ends at block 312.

At block 314, the control logic 114 controls the forwarding muxes 116 of FIG. 1 via control signal 168 to speculatively forward the newest store data 192 that has a physical page index 176 that matches the load instruction physical page index 174 to the load instruction, which has proceeded to the G-stage 105. That is, the forwarding muxes 116 select one of the four pieces of store data 192 stored in the store buffers 122 whose corresponding index_match signal 162 was true. In particular, the forwarding muxes 116 select the matching piece of store data 192 that was most recently stored in the store buffers 122. In addition, the operand select mux 198 selects the data 142 from the forwarding muxes 116 for provision to the E-stage 107 as the load instruction proceeds to the E-stage 107. Flow proceeds from block 314 to decision block 318.

At block 316, the physical page address comparators 112 of FIG. 1 compare the load physical page address 184 with the store physical page addresses 183 and generate the ppa_match[3:0] signals 164 of FIG. 1. Steps 314 and 316 occur substantially in parallel. Flow proceeds from block 316 to decision block 318.

At decision block 318, the control logic 114 examines the ppa_match[3:0] signals 164 to determine whether a match occurred between the load physical page address 184 and any of the store physical page addresses 183. If not, flow proceeds to block 322. Otherwise, flow ends.

At block 322, the control logic 114 asserts the STALL signal 172 of FIG. 1 to stall the microprocessor 100 pipeline. The control logic 114 stalls the pipeline because the storehit data was erroneously forwarded during step 314. That is, although the physical page index 174 of the load instruction matched the physical page index 176 of one of the store data 192, the load data resides in a different page in memory than the matching store data. Hence, the store data was erroneously forwarded, and the erroneous forward must be corrected by fetching the correct data specified by the full load physical address 186. Flow proceeds from block 322 to block 324.

At block 324, the correct load data specified by the full load physical address 186 is fetched from the data cache 108 or from memory. That is, if the full load physical address 186 generated a hit in the data cache 108, then the control logic 114 controls the forwarding muxes 116 to select the cache line 194 from the data cache 108. Otherwise, the control logic 114 controls the forwarding muxes 116 to select the response buffer data 178 when the data arrives from memory. In addition, the operand select mux 198 selects the data 142 from the forwarding muxes 116 for provision to the E-stage 107 where the load instruction is stalled until the correct data arrives. Flow proceeds from block 324 to block 326.

At block 326, the control logic 114 deasserts the STALL signal 172 to unstall the pipeline 100 once the correct data arrives, i.e., once the erroneous speculative store forward has been corrected. Flow ends at block 326.

Figure 4:
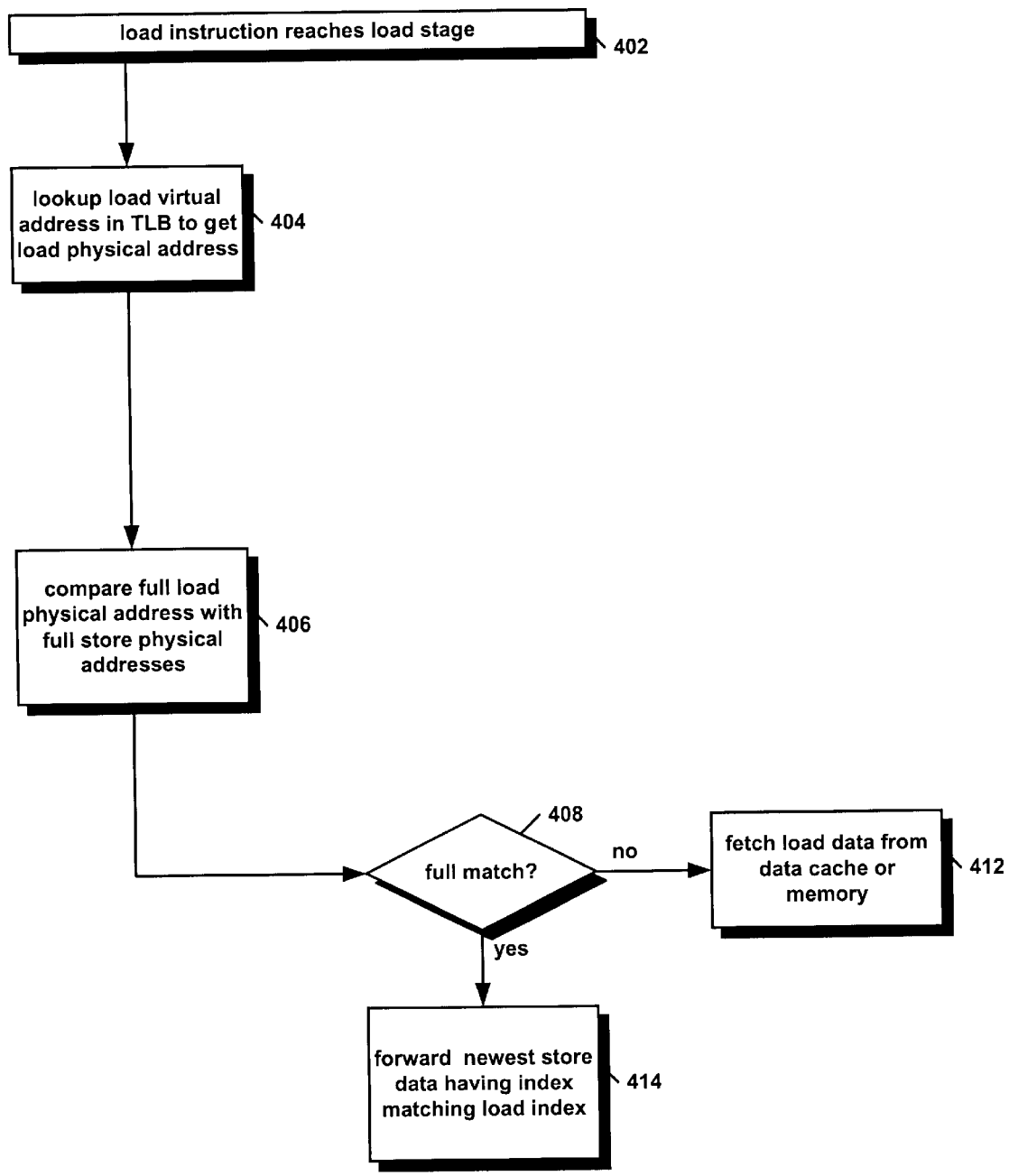
FIG. 4 is a flowchart illustrating a prior art store forwarding operation based on a full physical address comparison.

Referring now to FIG. 4, a flowchart illustrating a prior art store forwarding operation based on a full physical address comparison is shown. The prior art store forwarding operation will be described with respect to a prior art microprocessor. The prior art microprocessor does not includes the index comparators 106 and physical page address comparators 112 of FIG. 1. Rather, the prior art microprocessor would include a set of comparators for comparing the full physical address of a load instruction with pending store data full physical addresses after the TLB provided the translated physical page address. Furthermore, in a prior art microprocessor, disadvantageously, either the microprocessor cycle time would be lengthened, or an additional stage would be added in which forwarding muxes would reside to accommodate the full physical address compare serialized with the TLB lookup. Flow begins at block 402.

At block 402, a load instruction reaches the stage where load data is received. Flow proceeds from block 402 to block 404.

At block 404, the virtual address of the load instruction is provided to the TLB. The TLB looks up the virtual address and provides the translated physical address. Flow proceeds from block 404 to block 406.

At block 406, full physical address comparators compare the full load physical address with the full store data physical addresses and indicate whether or not a full match occurred. Flow proceeds from block 406 to decision block 408.

At decision block 408, it is determined whether a match occurred between the full load physical address and any of the store data full physical addresses. If not, flow proceeds to block 412. Otherwise, flow proceeds to block 414.

At block 412, the load data specified by the load instruction is loaded from the data cache or from memory through a response buffer. This is because a storehit did not occur, as determined during step 408. Flow ends at block 412.

At block 414, the newest storehit data is forwarded from the store buffers to the load instruction based on the physical address compare of block 406 that is serialized with the TLB lookup of block 404. Flow ends at block 414.

As may be observed by comparing FIG. 4 with FIG. 3, the prior art store forwarding operation serializes the TLB lookup, physical address compare, and forwarding operation. In contrast, the speculative store forwarding operation of the present invention compares the physical page indexes in parallel with the TLB lookup and forwards the storehit data based on the index compare in parallel with the full physical address compare based on the TLB lookup, thereby forwarding the storehit data sooner than the prior art method.

Furthermore, the smaller index comparators 106 and physical page address comparators 112 of the present invention compare fewer bits and consequently generate a result faster than the comparators needed in the prior art to perform a compare of the full physical address. This is advantageous in that it potentially facilitates shorter processor cycle time.

Although the present invention and its objects, features, and advantages have been described in detail, other embodiments are encompassed by the invention. For example, although embodiments are described with respect to specific paging mechanisms, the invention is adaptable to other paging mechanisms. In particular, the present invention is not limited to the x86 architecture. Furthermore, the invention is adaptable to virtual addresses, physical addresses, and physical page indexes of various sizes. In addition, the invention is adaptable to support various numbers of store buffers. Furthermore, other embodiments are contemplated in which the size of the physical page index to be compared varies in order to detect storehits of varying size and for speculatively forwarding storehit data of varying size. Finally, other embodiments are contemplated in which storehit data is forwarded from pipeline stages other than store buffers based on a physical page index comparison.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A speculative store forwarding apparatus in a microprocessor pipeline, the pipeline comprising first and second stages, the first stage for receiving load data specified by a load virtual address, the second stage for storing store data pending in the pipeline for writing to a store physical address, the load virtual address comprising a load virtual page number and a load physical page index, the store physical address comprising a store physical page address and a store physical page index, the apparatus comprising:
   an index comparator, for comparing the load physical page index with the store physical page index; and
   forwarding logic, coupled to said index comparator, for forwarding the store data from the second stage to the first stage if said index comparator indicates the load physical page index matches the store physical page index.

2. The apparatus of claim 1, further comprising:
   a translation lookaside buffer (TLB), coupled to said forwarding logic, for receiving the load virtual page number and providing a load physical page address in response thereto.

3. The apparatus of claim 2, further comprising:
   a physical page address comparator, coupled to said forwarding logic, for comparing the load physical page address with the store physical page address.

4. The apparatus of claim 3, wherein said forwarding logic stalls the pipeline after forwarding the store data if said physical page address comparator indicates the load physical page address does not match the store physical page address.

5. The apparatus of claim 3, wherein said forwarding logic forwards the store data from the second stage to the first stage substantially in parallel with said physical page address comparator comparing the load physical page address with the store physical page address.

6. The apparatus of claim 2, wherein said index comparator compares the load physical page index with the store physical page index substantially in parallel with said TLB looking up said load physical page address in response to the load virtual page number.

7. The apparatus of claim 1, wherein the second stage is after the first stage in the microprocessor pipeline.

8. The apparatus of claim 1, wherein said forwarding logic comprises:
   a forwarding multiplexer, coupled to receive the store data, for selectively forwarding the store data to the first stage based on said index comparator comparing the load physical page index with the store physical page index.

9. The apparatus of claim 8, wherein said forwarding multiplexer is further coupled to receive data from a data cache, wherein said forwarding multiplexer selectively forwards said data from said data cache to the first stage based on said index comparator comparing the load physical page index with the store physical page index.

10. The apparatus of claim 8, wherein said forwarding multiplexer is further coupled to receive data from a response buffer, wherein said forwarding multiplexer selectively forwards said data from said response buffer to the first stage based on said index comparator comparing the load physical page index with the store physical page index.

11. The apparatus of claim 1, wherein the load physical page index specifies an offset within a physical memory page.

12. The apparatus of claim 1, wherein the load virtual page number comprises 20 bits.

13. The apparatus of claim 1, wherein the store physical page address comprises 20 bits.

14. A microprocessor supporting paged virtual memory, comprising:
   an index match indicator, for indicating whether a physical page index of load data specified by a load instruction matches a physical page index of store data pending in the microprocessor; and
   forwarding logic, coupled to said index match indicator, for forwarding said store data to said load instruction if said index match indicator indicates that said load and store data physical page indexes match;
   wherein said forwarding logic forwards said store data to said load instruction based on said index match indicator prior to determining whether said load and store data reside in a same physical memory page.

15. The microprocessor of claim 14, further comprising:
   a physical page address match indicator, coupled to said forwarding logic, for indicating whether said load and store data reside in a same physical memory page.

16. The microprocessor of claim 15, further comprising:
   a stall signal, coupled to said physical page address match indicator, for stalling the microprocessor if said physical page address match indicator indicates said load and store data do not reside in a same physical memory page.

17. The microprocessor of claim 16, wherein said stall signal stalls the microprocessor subsequent to said forwarding logic forwarding said store data to said load instruction.

18. The microprocessor of claim 16, wherein said microprocessor asserts said stall signal until said load data is fetched from a physical memory page specified by said load instruction.

19. The microprocessor of claim 14, wherein the microprocessor is an x86 architecture microprocessor.

20. A method for speculatively forwarding storehit data in a microprocessor pipeline, the method comprising:
   comparing a physical page index of data specified by a load instruction with a physical page index of store data pending in the pipeline; and
   forwarding said store data from a first stage of the pipeline in which said store data is pending to a second stage of the pipeline for receiving said data specified by said load instruction, if said physical page index of data specified by said load instruction matches said physical page index of said store data.

21. The method of claim 20, further comprising:
   comparing a physical page address of said data specified by said load instruction with a physical page address of said store data.

22. The method of claim 21, further comprising:
   stalling the pipeline after said forwarding, if said physical page index of data specified by said load instruction does not match said physical page index of store data.

23. The method of claim 22, further comprising:
   providing correct data to said second stage during said stalling.

24. The method of claim 21, wherein said comparing said physical page address of said data specified by said load instruction with said physical page address of said store data is performed substantially in parallel with said forwarding.

25. The method of claim 21, further comprising:
   translating a virtual page number of said data specified by said load instruction into said physical page address prior to said comparing said physical page address of said data specified by said load instruction with said physical page address of said store data.

26. The method of claim 25, wherein said comparing said physical page index of said data specified by said load instruction with said physical page index of said store data pending is performed substantially in parallel with said translating said virtual page number of said data specified by said load instruction into said physical page address.

27. The method of claim 25, wherein said translating comprises:
providing said virtual page number to a translation lookaside buffer (TLB); and
obtaining said physical page address of said data specified by said load instruction from said TLB in response to said providing.

28. A pipelined microprocessor, comprising:
a plurality of store buffers, for storing a plurality of store datum waiting to be written to memory;
a plurality of address registers, coupled to said plurality of store buffers, for storing a corresponding plurality of physical page indexes of said plurality of store datum;
a plurality of index comparators, coupled to said plurality of address registers, for comparing said plurality of physical page indexes with a physical page index of data requested by a load instruction; and
control logic, coupled to said plurality of index comparators, for causing one of said plurality of store datum to be forwarded from said plurality of store buffers to said load instruction, if said plurality of index comparators indicates a corresponding one of said physical page indexes matches said physical page index of said data requested by said load instruction.

29. The microprocessor of claim 28, wherein said physical page index of said data requested by said load instruction specifies an offset within a physical page in a system memory coupled to the microprocessor.

30. The microprocessor of claim 29, wherein said physical page index of said data requested by said load instruction is provided to said plurality of index comparators without being translated from a virtual address of said data requested by said load instruction.

31. The microprocessor of claim 28, wherein said load instruction is issued by the microprocessor subsequent to issuance by the microprocessor of store instructions associated with said plurality of store datum.

32. The microprocessor of claim 28, wherein if said plurality of index comparators indicates more than one of said plurality of physical page indexes matches said physical page index of data requested by said load instruction, then said control logic causes a newest one of corresponding ones of said plurality of store datum to be forwarded to said load instruction.

33. The microprocessor of claim 32, wherein said control logic is configured to receive a control signal from said plurality of store buffers for specifying an age of each of said plurality of store datum waiting to be written to memory.

34. The microprocessor of claim 33, wherein said control logic causes said newest one of corresponding matching ones of said plurality of store datum to be forwarded to said load instruction based on said control signal received from said plurality of store buffers.

* * * * *